US008549852B2

(12) United States Patent
Saeki et al.

(10) Patent No.: US 8,549,852 B2
(45) Date of Patent: Oct. 8, 2013

(54) HYDRAULIC OIL TANK, HYDRAULIC OIL TANK MANUFACTURING METHOD AND CONSTRUCTION VEHICLE EQUIPPED WITH HYDRAULIC OIL TANK

(75) Inventors: Yoshinori Saeki, Hirakata (JP); Tatsushi Itou, Hirakata (JP)

(73) Assignee: Komatsu Ltd., Tokyo (JP)

( * ) Notice: Subject to any disclaimer, the term of this patent is extended or adjusted under 35 U.S.C. 154(b) by 16 days.

(21) Appl. No.: 13/514,562

(22) PCT Filed: May 31, 2011

(86) PCT No.: PCT/JP2011/062548
§ 371 (c)(1),
(2), (4) Date: Jun. 7, 2012

(87) PCT Pub. No.: WO2011/152431
PCT Pub. Date: Dec. 8, 2011

(65) Prior Publication Data
US 2012/0247596 A1 Oct. 4, 2012

(30) Foreign Application Priority Data
May 31, 2010 (JP) ................................ 2010-124771

(51) Int. Cl.
*F15B 1/26* (2006.01)
*E02F 9/00* (2006.01)
*B01D 35/027* (2006.01)

(52) U.S. Cl.
USPC .......... 60/454; 137/15.01; 137/545; 137/590; 137/592; 210/167.01; 210/172.3; 210/459

(58) Field of Classification Search
USPC ......... 137/15.01, 544, 545, 563, 565.19, 587, 137/590, 592; 90/453, 454; 210/167.01, 210/167.04, 172.1, 172.2, 172.3, 194, 210/195.1, 459
See application file for complete search history.

(56) References Cited

U.S. PATENT DOCUMENTS 2,242,807 A * 5/1941 Austin ............................ 60/454
4,531,368 A * 7/1985 Killen ............................. 60/454
5,477,882 A * 12/1995 Duthie .................... 137/565.19

(Continued)

FOREIGN PATENT DOCUMENTS

JP 51-17817 U 2/1976
JP 62-52301 U 4/1987

(Continued)

OTHER PUBLICATIONS

International Search Report of corresponding PCT Application No. PCT/JP2011/062548, Jul. 12, 2011.

*Primary Examiner* — John Rivell
(74) *Attorney, Agent, or Firm* — Global IP Counselors, LLP

(57) ABSTRACT

A hydraulic oil tank has a housing, a connecting member and a filtering device. The housing includes a main body, a storage compartment and a first through hole. The storage compartment is formed within the main body for containing a the hydraulic oil, and the first through hole is formed through the main body. The connecting member is disposed on the main body and covering the first through hole, the connecting member including a contact face having a planar shape. The filtering device is disposed within the storage compartment. The filtering device is connected to a part of the contact face exposed within the first through hole. The filtering device includes an overlapped portion overlapping with an inner edge of the first through hole in a plan view of the first through hole seen from inside of the storage compartment.

14 Claims, 13 Drawing Sheets

(56) References Cited

U.S. PATENT DOCUMENTS

| | | | | |
|---|---|---|---|---|
| 5,481,876 | A * | 1/1996 | Bay et al. | 60/454 |
| 6,382,245 | B1 * | 5/2002 | Ito | 60/454 |
| 7,261,123 | B2 * | 8/2007 | Kim | 60/454 |
| 7,299,820 | B2 * | 11/2007 | Come et al. | 137/574 |

FOREIGN PATENT DOCUMENTS

| | | | |
|---|---|---|---|
| JP | 5-187401 | A | 7/1993 |
| JP | 7-27102 | A | 1/1995 |
| JP | 10-280475 | A | 10/1998 |
| JP | 2004-84923 | A | 3/2004 |
| JP | 2006-46016 | A | 2/2006 |
| JP | 2006-161910 | A | 6/2006 |
| JP | 2006-282048 | A | 10/2006 |
| JP | 2008-119616 | A | 5/2008 |
| JP | 2010-19426 | A | 1/2010 |

* cited by examiner

HYDRAULIC OIL TANK, HYDRAULIC OIL TANK MANUFACTURING METHOD AND CONSTRUCTION VEHICLE EQUIPPED WITH HYDRAULIC OIL TANK

CROSS-REFERENCE TO RELATED APPLICATIONS

This application claims priority to Japanese Patent Application No. 2010-124771 filed on May 31, 2010, the disclosure of which is hereby incorporated herein by reference in its entirety.

BACKGROUND OF THE INVENTION

1. Field of the Invention

The present invention relates to a hydraulic oil tank embedded in a construction vehicle or the like, a hydraulic oil tank manufacturing method and a construction vehicle equipped with a hydraulic oil tank.

2. Background Art

Construction machines such as hydraulic shovels normally include a hydraulic oil tank for containing hydraulic oil to be circulated by a hydraulic pump. The hydraulic oil tank includes a housing defining a storage compartment and a filtering device disposed within the storage compartment. The storage compartment reserves the hydraulic oil. The filtering device is configured to filter wear powder contaminated in the hydraulic oil.

A method of fitting a filtering device to a through hole formed through a plate member forming a housing and then welding the outer periphery of the filtering device to the plate member has been proposed (see Japan Laid-open Patent Application Publication No. JP-A-H07-027102).

SUMMARY

However, such a through hole is generally formed through a plate member with low dimensional accuracy. Therefore, a clearance may be produced between the filtering device and the plate member when the method of Japan Laid-open Patent Application Publication No. JP-A-H07-027102 is employed. Further, it is not easy to fill the clearance by means of welding. Therefore, it is difficult to achieve sealing performance required for the hydraulic oil tank by means of welding when the method of Japan Laid-open Patent Application Publication No. JP-A-H07-027102 is employed.

The present invention has been produced in view of the aforementioned drawback, and it is an object of the present invention to provide a hydraulic oil tank for easily achieving required sealing performance by means of welding, a hydraulic oil tank manufacturing method and a construction vehicle equipped with a hydraulic oil tank.

A hydraulic oil tank according to a first aspect of the invention has a housing including a main body, a storage compartment and a first through hole, the storage compartment formed within the main body for containing a hydraulic oil, and the first through hole formed through the main body; a connecting member disposed on the main body for covering the first through hole, the connecting member including a contact face having a planar shape; and a filtering device disposed within the storage compartment. The filtering device is connected to a part of the contact face, the part of contact face part exposed within the first through hole. The filtering device includes an overlapped portion overlapping with an inner edge of the first through hole in a plan view of the first through hole seen from the inside of the storage compartment.

According to the hydraulic oil tank of the first aspect of the invention, since the first through hole can be covered with the connecting member, the first through hole can be more reliably closed than the structure that the filtering device is fitted into and welded to the first through hole. Therefore, it is possible to easily obtain sealing performance required for the hydraulic oil tank by welding the connecting member to the main body. Further, since the connecting member is abutted to the planar contact face of the housing, the connecting member can be freely moved on the outer surface of the housing after the filtering device, connected to the connecting member, is inserted into the housing through the first through hole. With the structure, the filtering device can be easily positioned even when the filtering device includes the overlapped portion.

In a hydraulic oil tank according to a second aspect of the invention relating to the first aspect of the invention, the first through hole is formed through a top face of the main body, the housing includes a hydraulic oil inlet formed through a lateral face of the main body, and the filtering device includes a tubular element chamber which is connected to the contact face of the connecting member and a communication path which communicates with the element chamber and the hydraulic oil inlet. The communication path is composed of the overlapped portion.

A hydraulic oil tank according to a third aspect of the invention relating to the first or second aspect of the invention further includes a flange connected onto the connecting member, wherein the connecting member includes a second through hole continuing to the first through hole, and the flange includes a third through hole continuing to the second through hole.

According to the hydraulic oil tank of the third aspect of the invention, since the filtering device is accessible from the outside through the second and third through holes, maintenance performance of the filtering device can be enhanced. It should be noted that a lid member can be detachably attached to the flange.

In a hydraulic oil tank according to a fourth aspect of the invention relating to the third aspect of the invention, the housing includes a fourth through hole formed through the main body, the fourth through hole is covered with the connecting member, the connecting member includes a fifth through hole continuing to the fourth through hole, and the flange includes a sixth through hole continuing to the fifth through hole.

In a hydraulic oil tank according to a fifth aspect of the invention relating to the hydraulic oil tank according to the third or fourth aspect of the invention, the second through hole is positioned inwards of the third through hole in a plan view of the top face.

According to the hydraulic oil tank of the fifth aspect of the present invention, the connecting member is partially exposed within the third through hole. Therefore, the flange can be welded to the connecting member within the third through hole, thereby sealing performance of the hydraulic oil tank can be enhanced.

In a hydraulic oil tank according to a sixth aspect of the invention relating to the first aspect of the invention, the first through hole is formed through a lateral face of the main body, the filtering device includes a suction casing connected to the contact face of the connecting member and a strainer disposed on the suction casing, and the suction casing is composed of the overlapped portion.

According to the hydraulic oil tank of the sixth aspect of the invention, sealing performance required for the hydraulic oil tank can be easily obtained even in the welding of the filtering device for filtering the hydraulic oil flowing out of the hydraulic oil tank.

In a hydraulic oil tank according to a seventh aspect of the invention relating to the sixth aspect of the invention, a lower hem of the connecting member is arranged along a lower hem of the lateral face.

According to the hydraulic oil tank of the seventh aspect of the invention, the connecting member can be disposed closer to the lower hem of the outer surface, thereby a suction pipe can be disposed as low as possible. As a result, the hydraulic oil can be drawn from the vicinity of the bottom surface of the storage compartment.

In a hydraulic oil tank according to an eighth aspect of the invention relating to the sixth or seventh aspect, the casing includes a fixation hole formed through a bottom face of the main body, and the suction casing includes a convex portion to be inserted into the fixation hole and welded to the bottom face.

According to the hydraulic oil tank of the eighth aspect of the invention, a part of the suction casing can be fixed to the inside of the storage compartment, thereby force can be inhibited from acting on the connected part between the filtering device and the connecting member. Further, the convex portion is welded to the main body from the outer surface side, thereby the inside of the storage compartment can be kept clean.

A hydraulic oil tank according to a ninth aspect of the invention relating to one of the sixth to eighth aspects of the present invention further includes a suction pipe extended from the connecting member, the suction pipe including a first opening sidewardly opened. The suction casing includes a second opening upwardly opened, the second opening disposed lower than a top end of the first opening.

According to the hydraulic oil tank of the ninth aspect of the invention, the hydraulic oil can be drawn from the vicinity of the bottom surface of the storage compartment, compared to the structure that the second opening is positioned higher than the top end of the first opening.

A method of manufacturing a hydraulic oil tank according to a tenth aspect of the invention includes preparing a first plate member including a first through hole; connecting a filtering device to a connecting member having an outer circumference greater than a circumference of the first through hole; passing the filtering device through the first through hole; positioning the filtering device; and connecting an outer periphery of the connecting member to the first plate member.

According to the method of manufacturing a hydraulic oil tank of the tenth aspect of the invention, the first through hole can be covered with the connecting member, thereby the first through hole can be more reliably closed than the structure that the filtering device is fitted into and welded to the first through hole. Therefore, it is possible to easily obtain sealing performance required for the hydraulic oil tank by welding the connecting member to the main body.

In a method of manufacturing a hydraulic oil tank according to an eleventh aspect of the invention relating to the tenth aspect of the invention, positioning the filtering device includes overlapping an overlapped portion of the filtering device with an inner edge of the first through hole in a plan view of the first through hole seen from inside of a storage compartment.

A method of manufacturing a hydraulic oil tank according to a twelfth aspect of the invention relating to the tenth or eleventh aspect of the invention further includes: preparing a second plate member including a fitting hole; and fitting a connector part of the filtering device into the fitting hole after passing the filtering device through the first through hole, the connector part connected to a hydraulic oil pipe for supplying hydraulic oil.

According to the method of manufacturing a hydraulic oil tank of the twelfth aspect of the invention, the filtering device and the connecting member are assembled, thereby minute positional adjustment of the filtering device can be thereby executed through the connecting member. Therefore, the connecting member can be easily fitted into the fitting hole.

A method of manufacturing a hydraulic oil tank according to a thirteenth aspect of the invention relating to the one of the tenth to twelfth aspects of the invention further includes forming a second through hole penetrating the connecting member.

According to the method of manufacturing a hydraulic oil tank of the thirteenth aspect of the present invention, it is possible to provide a hydraulic oil tank that the filtering device is accessible from the outside through the second and third through holes. Therefore, maintenance performance of the filtering device can be enhanced.

A construction vehicle according to a fourteenth aspect of the invention includes a working unit, the hydraulic oil tank according to one of the first to ninth aspects of the present invention, and a hydraulic pump configured to draw the hydraulic oil from the hydraulic oil tank and circulate the drawn hydraulic oil through the working unit.

Overall, according to the present invention, it is possible to provide a hydraulic oil tank for easily achieving required sealing performance by means of welding, a hydraulic oil tank manufacturing method and a construction vehicle equipped with a hydraulic oil tank.

DETAILED DESCRIPTION OF THE EMBODIMENTS

Figure 1:
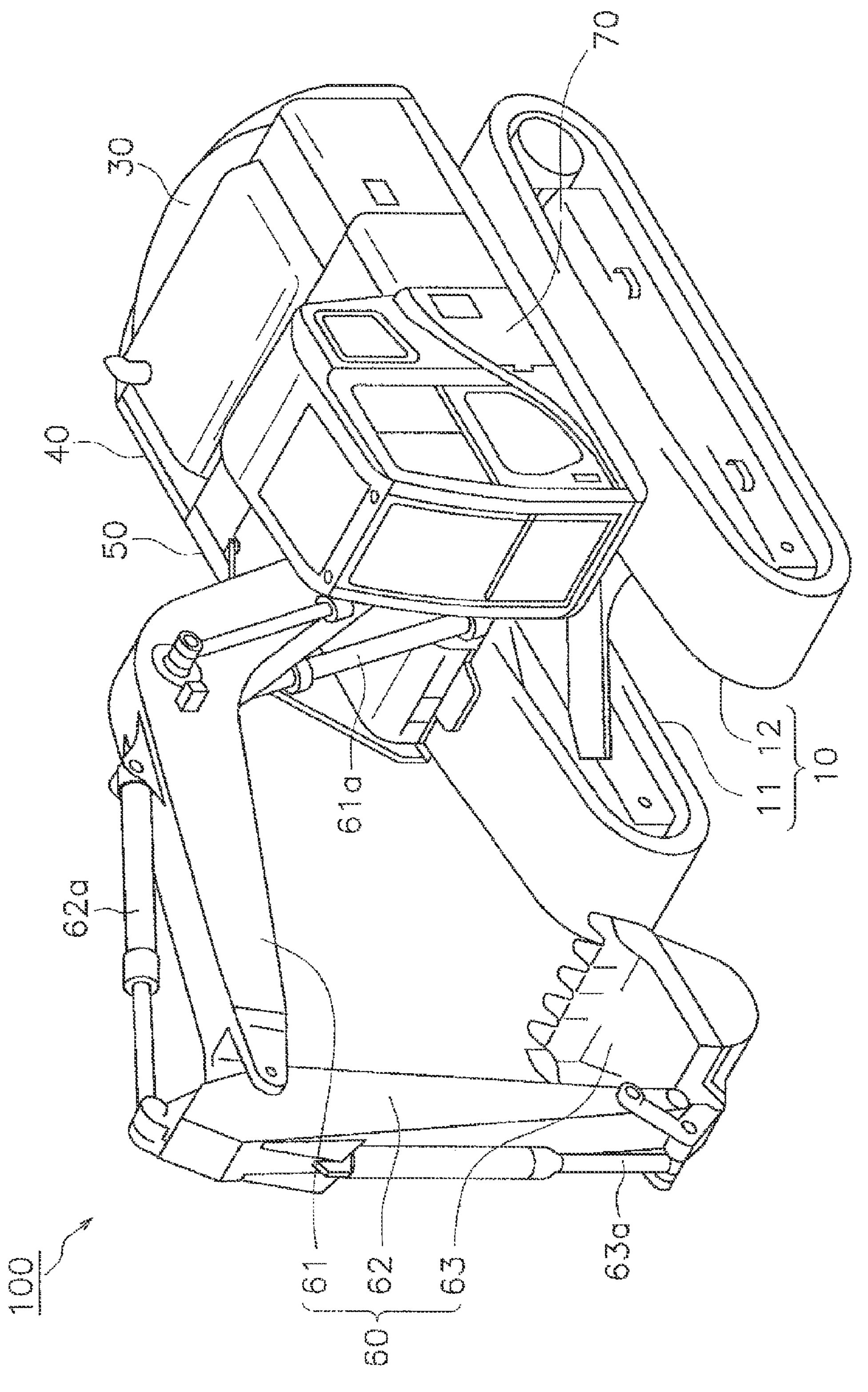
FIG. 1 is a structural perspective view of a construction vehicle 100 according to an exemplary embodiment of the present invention.

Next, an exemplary embodiment of the present invention will be hereinafter explained with reference to the attached drawings. The same or like reference numerals are used through the following description regarding the drawings to refer to the same or like elements. It should be noted that the drawings are schematically only and dimensional ratio and etc. among respective elements may be different from actual ones. Therefore, specific dimension and etc. should be judged based on the following description. It is also apparent that dimensional relation and/or ratio may be different even among elements mutually illustrated in the drawings.

Structure of Construction Vehicle 100

Figure 2:
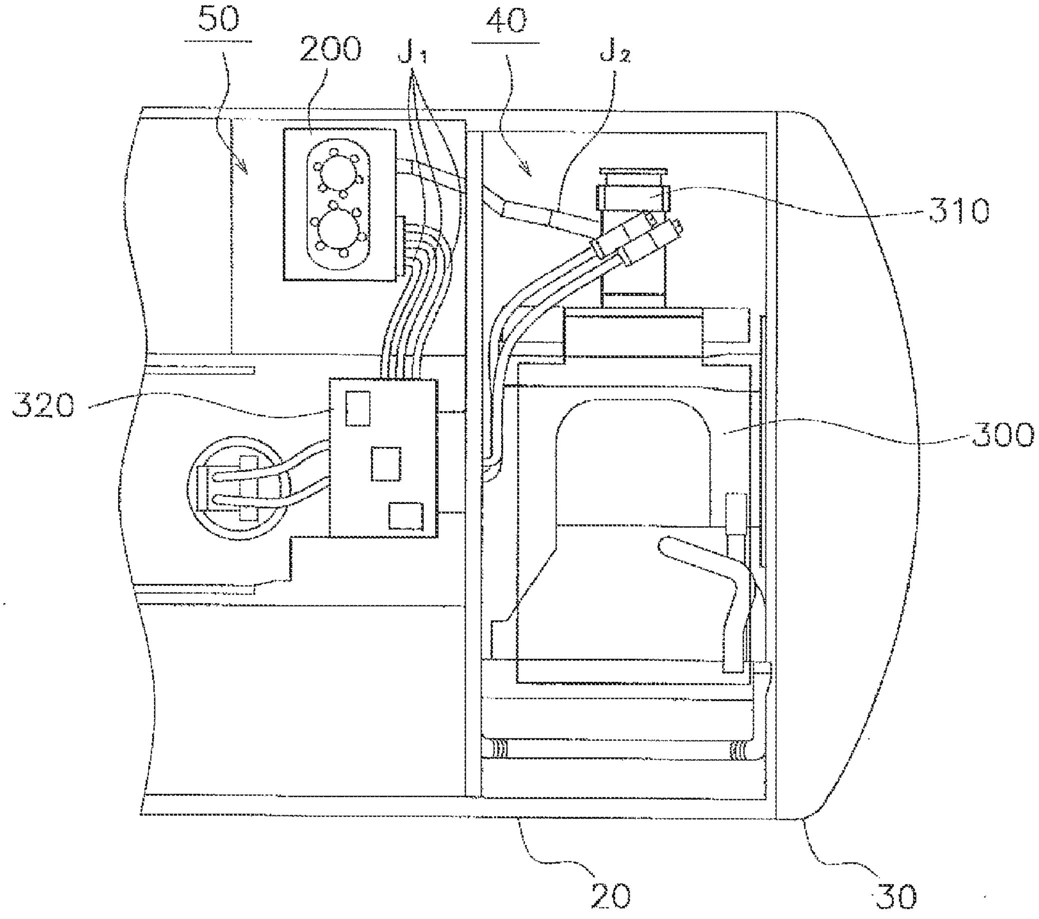
FIG. 2 is a structural plan view of a hydraulic oil tank 200 and its periphery according to the exemplary embodiment.

A structure of a construction vehicle 100 according to the present exemplary embodiment will be hereinafter explained with reference to the drawings. In the present exemplary embodiment, a hydraulic shovel will be explained as an example of the construction vehicle 100. FIG. 1 is a structural perspective view of the construction vehicle 100 according to the present exemplary embodiment. FIG. 2 is a structural plan view of a hydraulic oil tank 200 and its periphery according to the present exemplary embodiment.

As illustrated in FIG. 1, the construction vehicle 100 includes a lower travelling unit 10, a revolving unit 20, a counterweight 30, an engine compartment 40, a machine compartment 50, a working unit 60 and a cab 70.

The lower travelling unit 10 is configured to drive a pair of crawler belts 11 and 12 mounted in the right-left direction of the vehicle. The construction vehicle 100 is thereby configured to be moved in a variety of directions including a front-back direction of the vehicle.

The revolving unit 20 is mounted on the lower travelling unit 10. The revolving unit 20 is revolvably supported by the lower travelling unit 10. Further, the counterweight 30, the engine compartment 40, the machine compartment 50, the working unit 60 and the cab 70 are disposed on the revolving unit 20.

The counterweight 30 is mounted on the rear end of the revolving unit 20. For example, the counterweight 30 is formed by putting iron scrapes, concrete and etc. in a box formed by assembling steel plates. The counterweight 30 is utilized for balancing the vehicle body in executing a variety of works such as excavation.

The engine compartment 40 accommodates an engine 300, a hydraulic pump 310 and etc. The engine 300 and the hydraulic pump 310 are disposed on the revolving unit 20. The hydraulic pump 310 is configured to draw hydraulic oil from the hydraulic oil tank 200 and circulate the hydraulic oil through the working unit 60. The hydraulic pump 310 is connected to the hydraulic oil tank 200 through a second hydraulic oil pipe $J_2$.

The machine compartment 50 accommodates the hydraulic oil tank 200, an operating valve 320 and etc. The hydraulic oil tank 200 and the operating valve 320 are disposed on the revolving unit 20. The hydraulic oil tank 200 contains hydraulic oil to be supplied to the working unit 60. The hydraulic oil tank 200 is connected to the operating valve 320 through three first hydraulic oil pipes $J_1$. The hydraulic oil tank 200 is connected to the hydraulic pump 310 through the second hydraulic oil pipe $J_2$. The hydraulic oil sequentially flows through the operating valve 320, the first hydraulic oil pipes $J_1$, the hydraulic oil tank 200, the second hydraulic oil pipe $J_2$ and the hydraulic pump 310 in this order. The structure of the hydraulic oil tank 200 will be described below.

The working unit 60 is disposed forwards of the machine compartment 50. The working unit 60 includes a boom 61, an arm 62 attached to the tip of the boom 61, and a bucket 63 attached to the tip of the arm 62. The boom 61, the arm 62 and the bucket 63 are configured to be driven up and down by means of hydraulic cylinders 61*a*, 62*a* and 63*a*, respectively. The hydraulic cylinders 61*a*, 62*a* and 63*a* form a part of a hydraulic circuit in which the hydraulic oil is circulated.

The cab 70 is an operating room where an operator of the construction vehicle 100 is seated. The cab 70 is disposed forwards of the machine compartment 60 while being disposed laterally to the working unit 60 for allowing an operator to overlook movement of the working unit 60.

Overall Structure of Hydraulic Oil Tank 200

Figure 3:
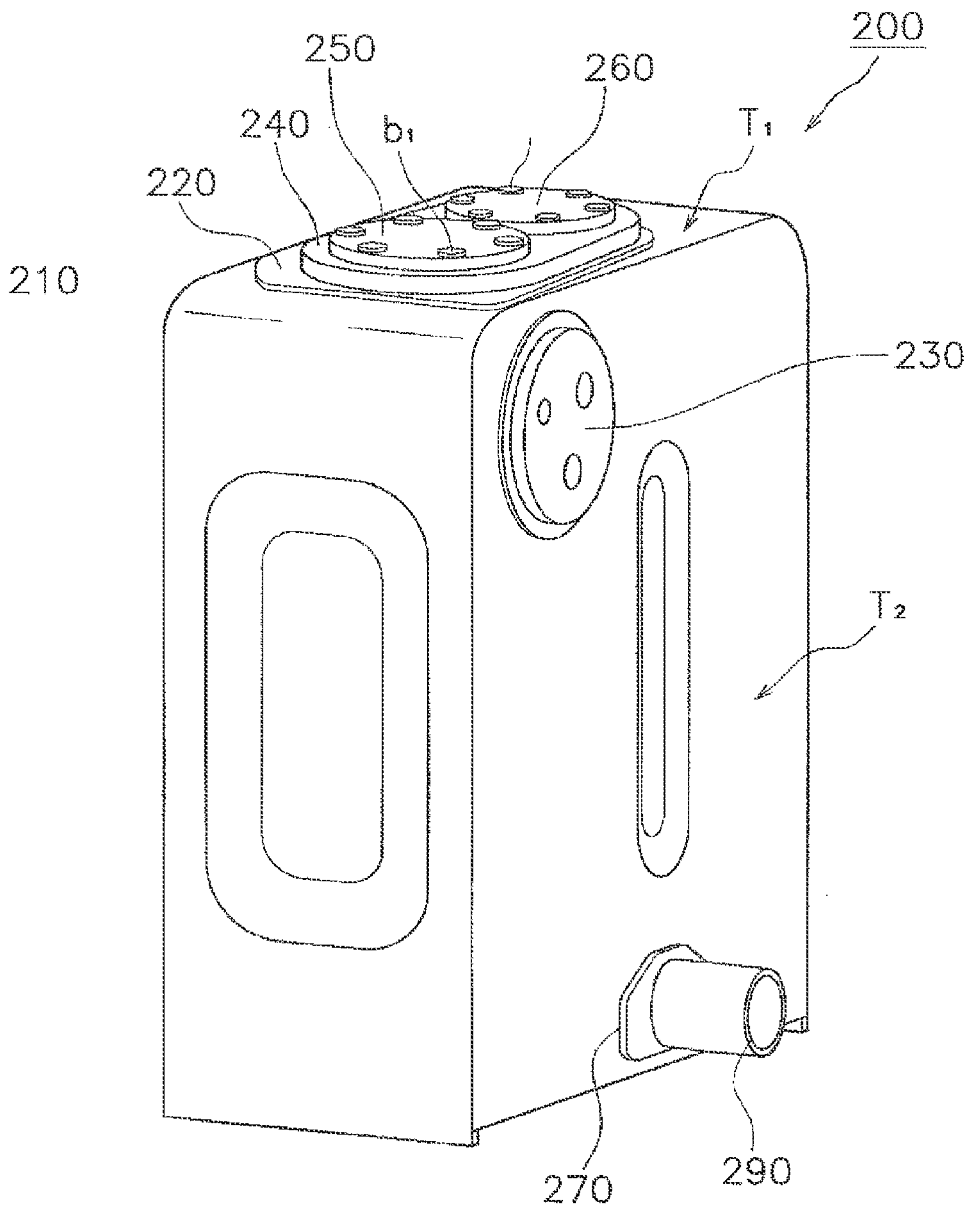
FIG. 3 is a structural perspective view of the hydraulic oil tank 200 according to the exemplary embodiment.
Figure 4:
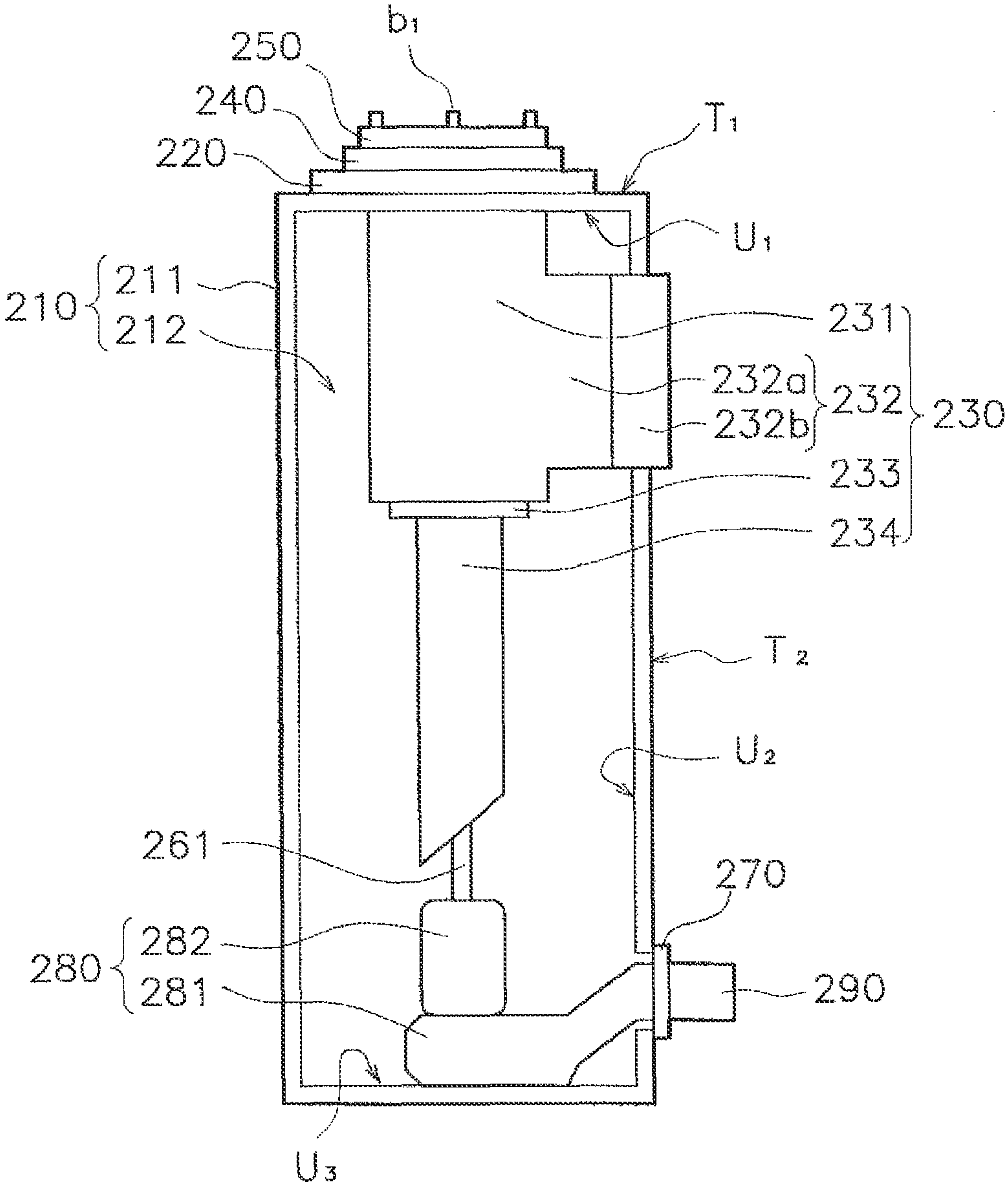
FIG. 4 is a transparent side view of the hydraulic oil tank 200 according to the exemplary embodiment.
Figure 5:
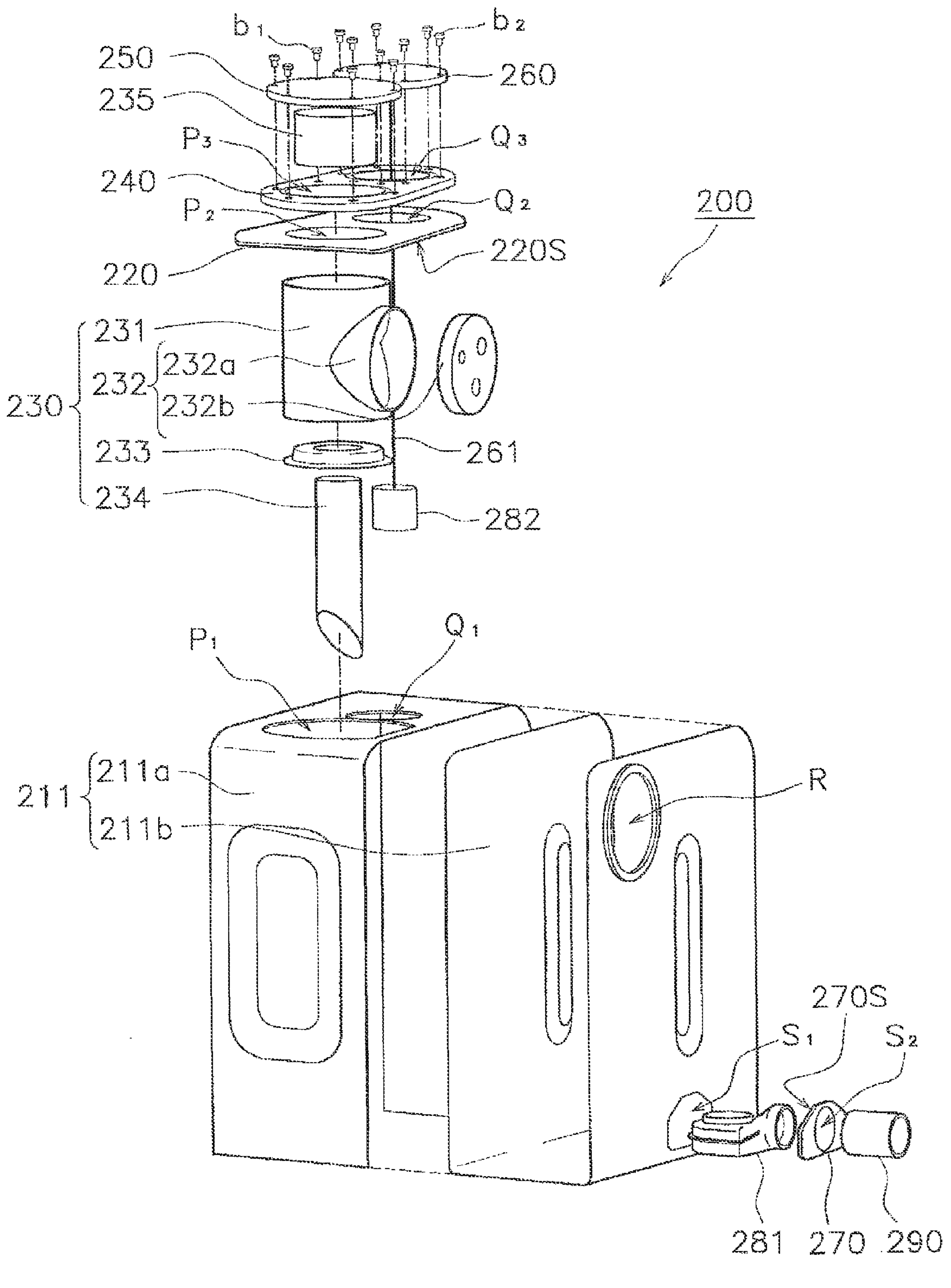
FIG. 5 is an exploded structural perspective view of the hydraulic oil tank 200 according to the exemplary embodiment.

Next, the overall structure of the hydraulic oil tank 200 according to the present exemplary embodiment will be explained with reference to the drawings. FIG. 3 is a structural perspective view of the hydraulic oil tank 200 according to the present exemplary embodiment. FIG. 4 is a transparent side view of the hydraulic oil tank 200 according to the present exemplary embodiment. FIG. 5 is an exploded structural perspective view of the hydraulic oil tank 200 according to the present exemplary embodiment.

As illustrated in FIGS. 3 to 5, the hydraulic oil tank 200 includes a housing 210, an upper connecting member 220, an upper filtering device 230, a flange 240, a first lid part 250, a second lid part 260, a lower connecting member 270, a lower filtering device 280 and a suction pipe 290.

As illustrated in FIGS. 4 and 5, the housing 210 includes a main body 211 and a storage compartment 212. The main body 211 includes a top face $T_1$ and a lateral face $T_2$. The top face $T_1$ and the lateral face $T_2$ are the outer surfaces of the main body 211. The storage compartment 212 is produced within the main body 211 for reserving the hydraulic oil. The storage compartment 212 includes a top face $U_1$, a lateral face $U_2$ and a bottom face $U_3$. The top face $U_1$, the lateral face $U_2$ and the bottom face $U_3$ are the inner surfaces of the storage compartment 212.

As illustrated in FIG. 5, the housing 210 further includes a first upper through hole $P_1$, a first strainer through hole $Q_1$, a fitting hole R (an example of "a hydraulic oil inlet") and a first lower through hole $S_1$ (an example of "a hydraulic oil outlet"). Each of the first upper through hole $P_1$ and the first strainer through hole $Q_1$ penetrates through the main body 211 from the top face $T_1$ of the main body 211 to the top face $U_1$ of the storage compartment 212. Each of the fitting hole R and the first lower through hole $S_1$ penetrates through the main body 211 from the lateral face $T_2$ of the main body 211 to the lateral face $U_2$ of the storage compartment 212.

It should be noted that the main body 211 is formed by a first plate member 211*a* and a second plate member 211*b*. Each of the first and second plate members 211*a* and 211*b* is formed by bending plate-shaped metal member in a U-shape. The storage compartment 212 is formed by combining the first and second plate members 211*a* and 211*b* and welding them along a contact line therebetween.

The upper connecting member 220 is connected onto the top face $T_1$ of the main body 211. As illustrated in FIG. 5, the upper connecting member 220 includes a contact face 220S, a second upper through hole $P_2$ and a second strainer through hole $Q_2$. The contact face 220S has a planar shape and is abutted to the top face $T_1$ of the main body 211. As described below, the second upper through hole $P_2$ continues to the first upper through hole $P_1$ (see FIG. 8). The upper connecting member 220 is disposed for covering the first upper through hole $P_1$ and the first strainer through hole $Q_1$.

The upper filtering device 230 is configured to filter wear powders contaminated in the hydraulic oil flowing into the hydraulic oil tank 200. The upper filtering device 230 is connected to the bottom face of the upper connecting member 220 and is inserted into the storage compartment 212 through the first upper through hole $P_1$.

As illustrated in FIGS. 4 and 5, the upper filtering device 230 includes an element chamber 231, a communication part 232, a bottom part 233 and a conduit 234. The top end of the element chamber 231 is connected to the upper connecting member 220. The element chamber 231 has a tubular shape and accommodates an oil element 235. The communication part 232 allows communication between the fitting hole R and the element chamber 231. In the present exemplary embodiment, the communication part 232 is formed by a tubular communication path 232*a* and a connector part 232*b* fitted into the fitting hole R. Three first hydraulic oil pipes $J_1$ are connected to the connector part 232*b*. Thus structured communication part 232 is overlapped with the inner edge of the first upper through hole $P_1$ in a plan view of the first upper through hole $P_1$ seen from the inside of the storage compartment 212. Thus structured communication part 232 forms "an overlapped portion" according to the present exemplary embodiment. The bottom part 233 forms a bottom plate of the element chamber 231. The conduit 234 is connected to the bottom face of the bottom part 233. The conduit 234 directs hydraulic oil to the storage compartment 212 after the hydraulic oil flows through the element chamber 231.

The flange 240 is connected onto the upper connecting member 220. As illustrated in FIG. 5, the flange 240 includes a third upper through hole $P_3$ and a third strainer through hole $Q_3$. As described below, the third upper through hole $P_3$ continues to the second upper through hole $P_2$ (see FIG. 8).

The first lid part 250 closes the third upper through hole $P_3$ of the flange 240. The first lid part 250 is detachably attached to the flange 240 by means of six bolts $b_1$. The oil element 235 can be replaced by detaching the first lid part 250.

The second lid part 260 closes the third strainer through hole $Q_3$ of the flange 240. The second lid part 260 is detachably attached to the flange 240 by means of six bolts $b_2$. A presser bar 261 is coupled to the bottom face of the second lid part 260. A strainer 282, forming a part of the lower filtering device 280, is detachably attached to the tip of the presser bar 261. The strainer 282, coupled to the presser bar 261, can be replaced by detaching the second lid part 260.

As illustrated in FIG. 4, the lower connecting member 270 is connected onto the lateral face $T_2$ of the main body 211. As illustrated in FIG. 5, the lower connecting member 270 includes a contact face 270S and a second lower through hole $S_2$. The contact face 270S has a planar shape and is abutted to the lateral face $T_2$ of the main body 211. As described below, the second lower through hole $S_2$ continues to the first lower through hole $S_1$ (see FIG. 8). The lower connecting member 270 is disposed for covering the first lower through hole $S_1$.

The lower filtering device 280 is configured to filter wear powders contaminated in the hydraulic oil flowing out of the hydraulic oil tank 200.

As illustrated in FIGS. 4 and 5, the lower filtering device 280 includes a suction casing 281 and the strainer 282. The suction casing 281 is connected to the lower connecting member 270 while being disposed on the bottom face $U_3$ of the storage compartment 212. The suction casing 281 is overlapped with the inner edge of the first lower through hole $S_1$ in a plan view of the first lower through hole $S_1$ seen from the inside of the storage compartment 212. Thus structured suction casing 281 forms "the overlapped portion" according to the present exemplary embodiment. The strainer 282 is disposed on the suction casing 281. The strainer 282 is pressed towards the suction casing 281 by means of the presser bar 261. The strainer 282 has a function similar to that of the oil element 235.

The suction pipe 290 is horizontally extended from the lateral face $T_2$ of the housing 210. The suction pipe 290 is connected to the lower connecting member 270. The second hydraulic oil pipe $J_2$ is coupled to the suction pipe 290.

Detailed Structure of Hydraulic Oil Tank 200

Next, the detailed structure of the hydraulic oil tank 200 according to the present exemplary embodiment will be explained with reference to the attached drawings. It should be noted that illustrations of the first and second lid parts 250 and 260 are omitted in the drawings to be referred.

(1) Upper Connecting Member 220 and its Periphery

Figure 6:
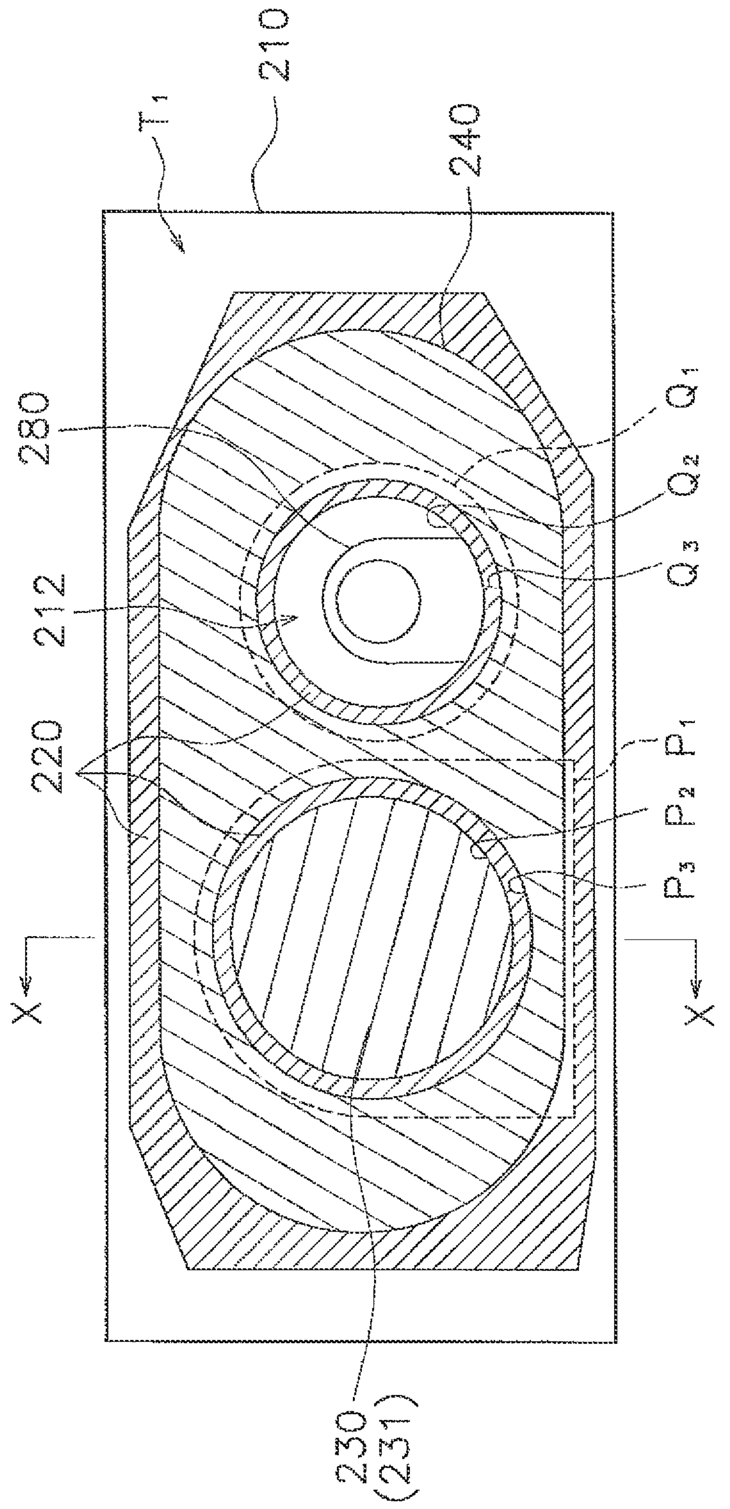
FIG. 6 is a plan view of a top face $T_1$ of a main body 211 according to the exemplary embodiment.

FIG. 6 is a plan view of the top face $T_1$ of the main body 211 according to the present exemplary embodiment.

As illustrated in FIG. 6, the outer circumference of the upper connecting member 220 is larger than the circumference of the first upper through hole $P_1$. Therefore, the upper connecting member 220 covers the circumference of the first upper through hole $P_1$. Likewise, the outer circumference of the upper connecting member 220 is greater than the circumference of the first strainer through hole $Q_1$ of the housing 210. Therefore, the upper connecting member 220 covers the circumference of the first strainer through hole $Q_1$.

Further, as illustrated in FIG. 6, the second upper through hole $P_2$ of the upper connecting member 220 is disposed inwards of the third upper through hole $P_3$ of the flange 240. Therefore, the upper connecting member 220 is exposed within the third upper through hole $P_3$. Likewise, the second strainer through hole $Q_2$ of the upper connecting member 220 is disposed inwards of the third strainer through hole $Q_3$ of the flange 240. Therefore, the upper connecting member 220 is exposed within the third strainer through hole $Q_3$.

As illustrated in FIG. 6, the inside of the element chamber 231 of the upper filtering device 230 is visible through the first upper through hole $P_1$ while the lower filtering device 280 is visible through the first strainer through hole $Q_1$.

Figure 7:
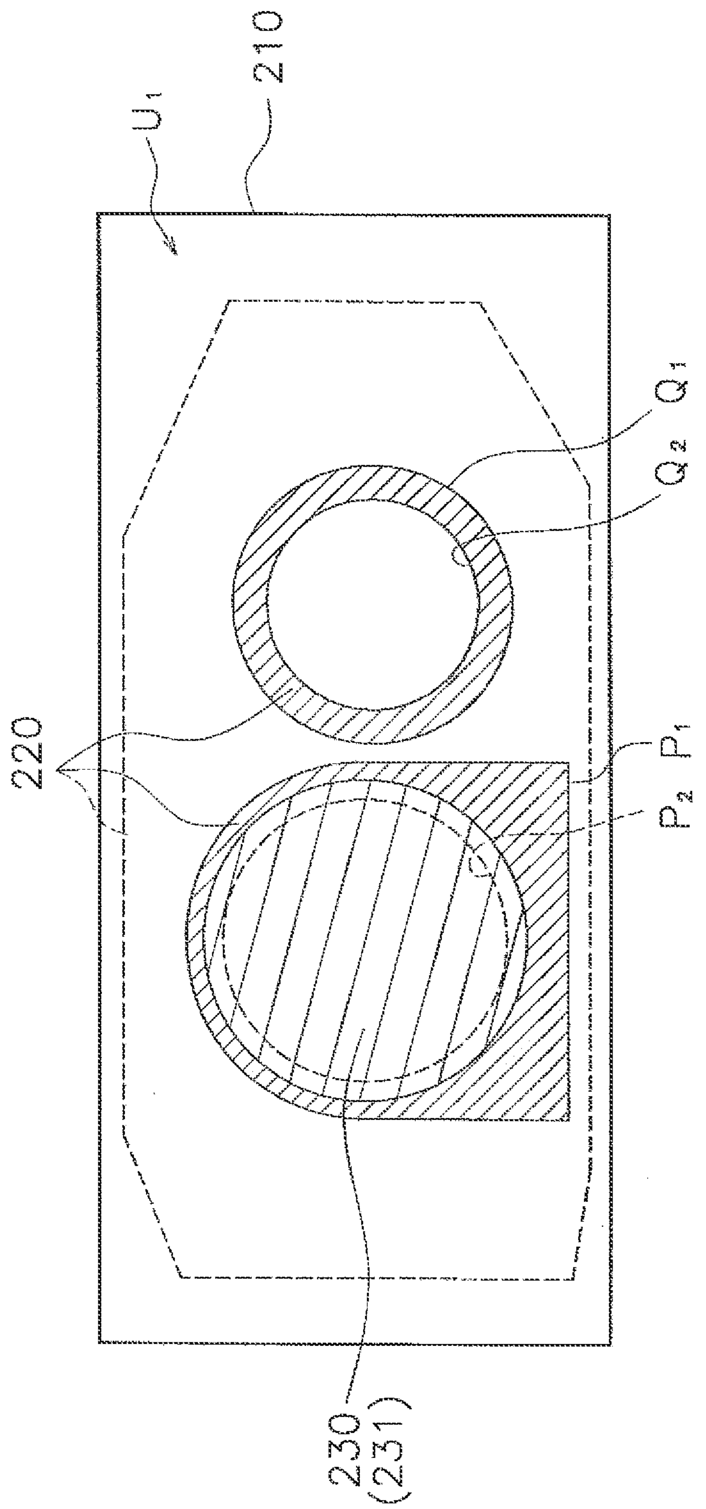
FIG. 7 is a plan view of a top face $U_1$ of a storage compartment 212 according to the exemplary embodiment.

FIG. 7 is a plan view of the top face $U_1$ of the storage compartment 212 according to the present exemplary embodiment.

As illustrated in FIG. 7, the outer circumference of the upper filtering device 230 is disposed inwards of the first upper through hole $P_1$. In other words, the outer circumference of the top end of the upper filtering device 230 is less than the circumference of the first upper through hole $P_1$. The upper connecting member 220 is partially exposed between the outer circumference of the upper filtering device 230 and the circumference of the first upper through hole $P_1$.

Further, the outer circumference of the upper filtering device 230 (specifically, the element chamber 231) is greater than the circumference of the second upper through hole $P_2$ as illustrated in FIG. 7. In other words, the upper filtering device 230 covers the second upper through hole $P_2$.

Figure 8:
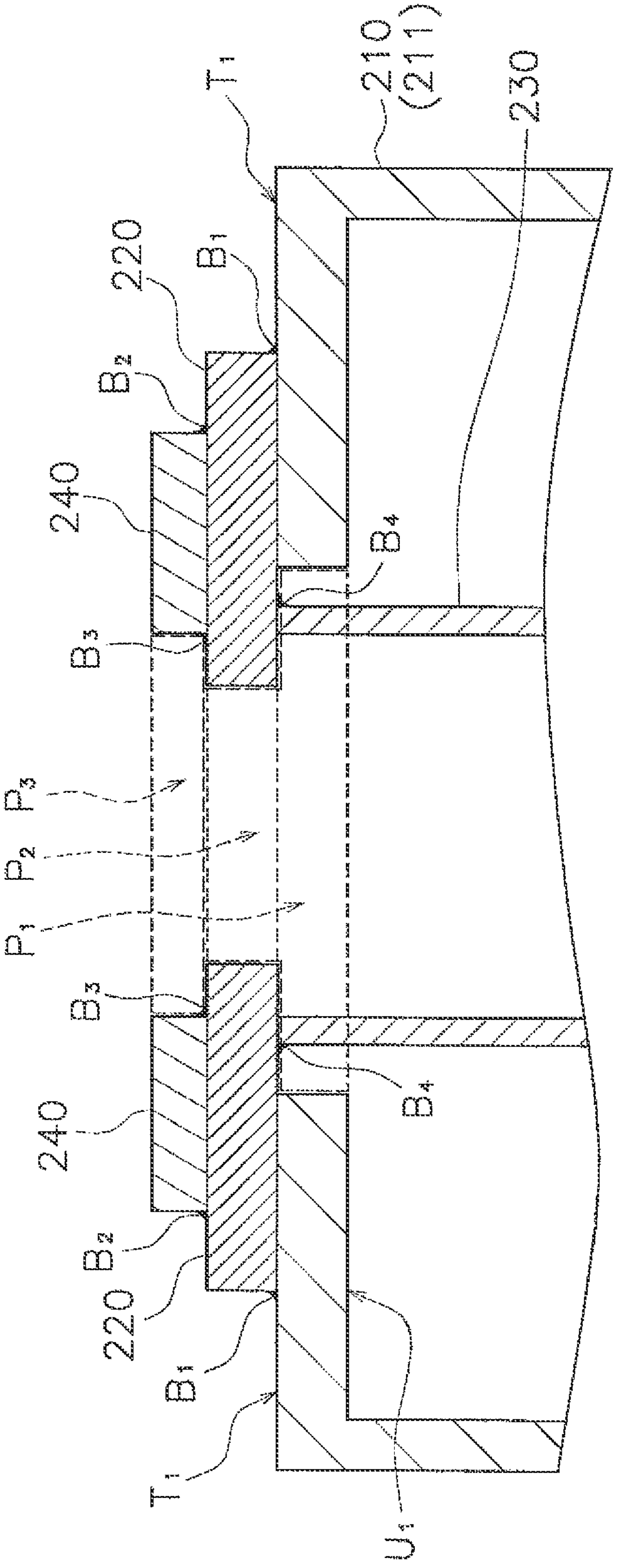
FIG. 8 is an enlarged cross-sectional view of FIG. 6 sectioned along a line X-X.

FIG. 8 illustrates an enlarged cross-sectional view of FIG. 6 sectioned along a line X-X.

The upper connecting member 220 is welded to the housing 210 (the main body 211). A weld bead $B_1$ is annularly formed along the outer circumference of the upper connecting member 220 by means of the welding process. The weld bead $B_1$ is formed in contact with the top face $T_1$ of the housing 210 (the main body 211) and the lateral face of the upper connecting member 220.

Further, the flange 240 is welded to the upper connecting member 220. Through the welding process, a weld bead $B_2$ is annularly formed along the outer circumference of the flange 240 while a weld bead $B_3$ is annularly formed along the inner periphery of the third upper through hole $P_3$. The weld bead $B_2$ is formed in contact with the top face of the upper connecting member 220 and the lateral face of the flange 240. The weld bead $B_3$ is formed in contact with the inner peripheral surface of the third upper through hole $P_3$ and the top face of the upper connecting member 220.

Further, the upper filtering device 230 is welded to the upper connecting member 220. Through the welding process, a weld bead $B_4$ is annularly formed along the outer circumference of the upper filtering device 230. The weld bead $B_4$ is formed in contact with the bottom face of the upper connecting member 220 to the lateral face of the upper filtering device 230.

(2) Lower Connecting Member 270 and its Periphery

Figure 9:
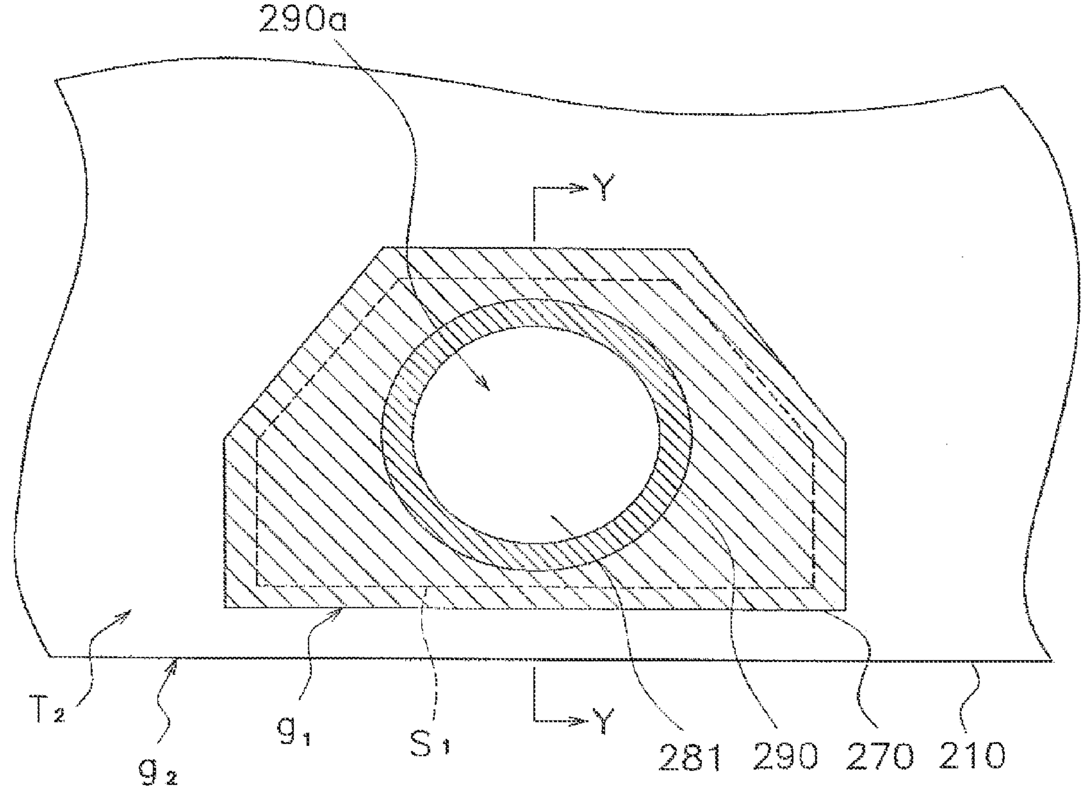
FIG. 9 is an enlarged plan view of a lateral face $T_2$ of the main body 211 according to the exemplary embodiment.

FIG. 9 is an enlarged plan view of the lateral face $T_2$ of the main body 211 according to the present exemplary embodiment.

In a plan view of the lateral face $T_2$, the outer circumference of the lower connecting member 270 is greater than the circumference of the first lower through hole $S_1$. Therefore, the lower connecting member 270 covers the circumference of the first lower through hole $S_1$.

Further, a lower hem $g_1$ of the lower connecting member 270 is arranged along a lower hem $g_2$ of the housing 210.

Figure 10:
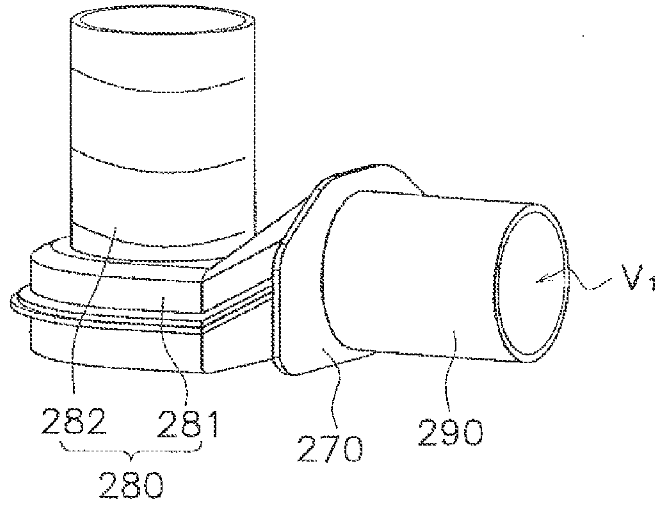
FIG. 10 is a structural perspective view of a lower connecting member 270 and its periphery according to the exemplary embodiment.

FIG. 10 is a structural perspective view of the lower filtering device 280 and its periphery according to the present exemplary embodiment.

The lower filtering device 280 and the suction pipe 290 are coupled through the lower connecting member 270. The suction pipe 290 includes a first opening $V_1$ sidewardly opened.

Figure 11:
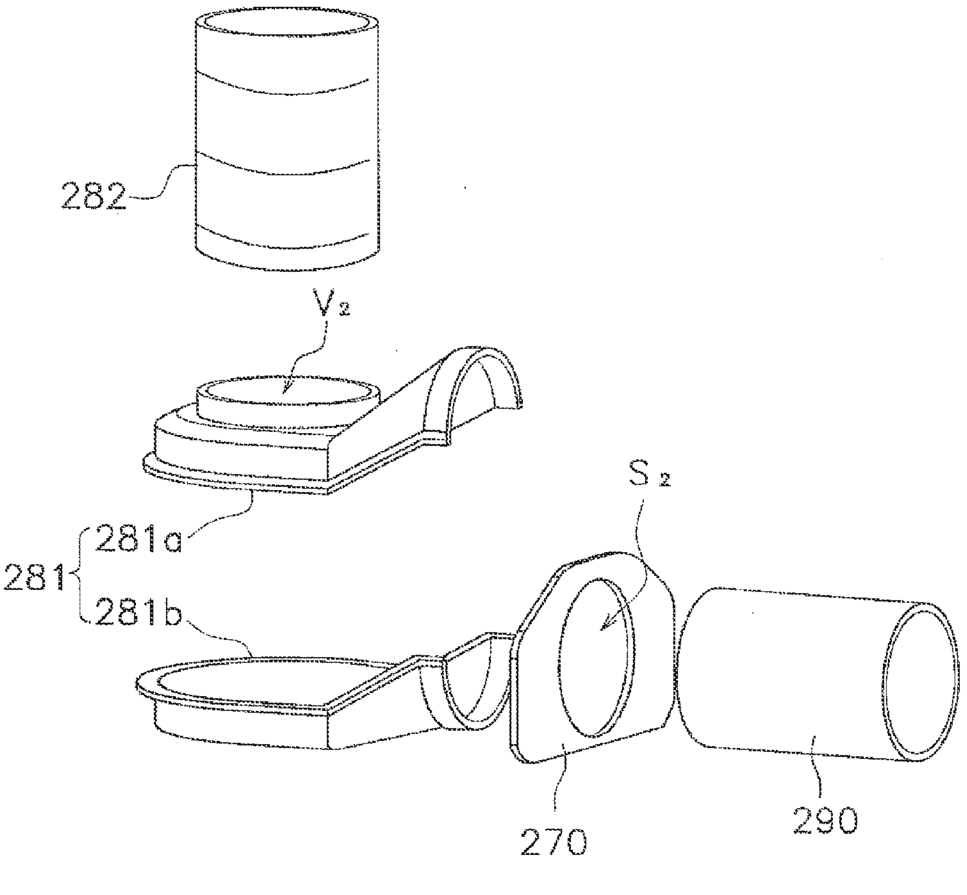
FIG. 11 is an exploded structural perspective view of the lower connecting member 270 and its periphery according to the exemplary embodiment.

FIG. 11 is an exploded perspective view of the structure of the lower filtering device 280 and its periphery according to the present exemplary embodiment.

The suction casing 281 is formed by an upper part 281*a* and a lower part 281*b*. In the present exemplary embodiment, the upper part 281*a* and the lower part 281*b* are welded along a contact line therebetween.

The suction casing 281 includes a second opening $V_2$ upwardly opened. The second opening $V_2$ is formed through the top face of the upper part 281*a*. The bottom end of the strainer 282 is fitted to the upper part 281*a*, and the second opening $V_2$ is thereby covered with the strainer 282. The hydraulic oil flows into the second opening $V_2$ after passing through the strainer 282.

Figure 12:
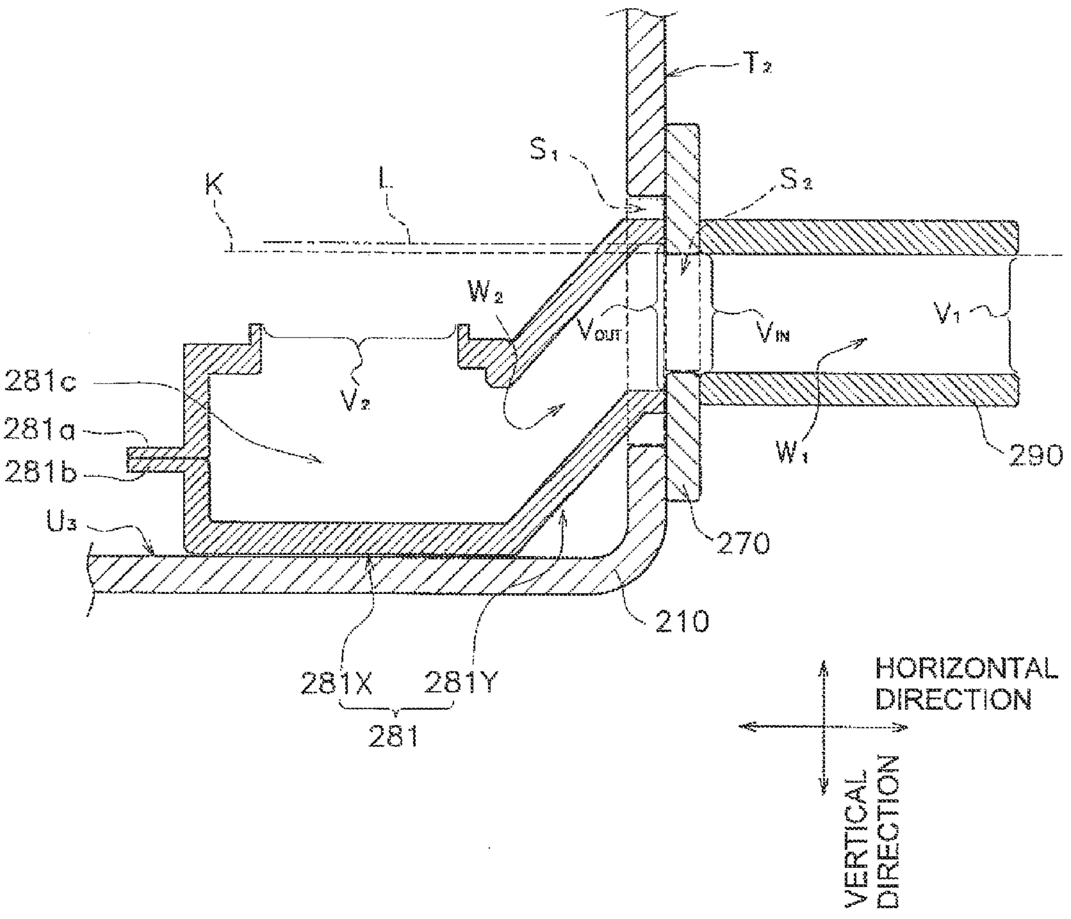
FIG. 12 is an enlarged cross-sectional view of FIG. 9 sectioned along a line Y-Y.

FIG. 12 is herein an enlarged cross-sectional view of FIG. 9 sectioned along a line Y-Y. FIG. 12 omits illustration of the strainer 282.

The suction pipe 290 is horizontally extended from the lateral face $T_2$ of the housing 210. The suction pipe 290 forms a first oil conduit path $W_1$. The suction pipe 290 includes the first opening $V_1$ and an inlet $V_{IN}$, which are formed on the both ends of the first oil conduit path $W_1$. The first opening $V_1$ is sidewardly opened to the outside of the hydraulic oil tank 200. The inlet $V_{IN}$ continues to a second lower through hole $S_2$ of the lower connecting member 270.

Further, the suction casing 281 includes a casing body 281X and an oil conduit 281Y. In the present exemplary embodiment, the casing body 281X and the oil conduit 281Y are integrally formed by the upper part 281*a* and the lower part 281*b*.

The casing body 281X is disposed on the bottom face $U_3$ of the storage compartment 212. The casing body 281X forms a suction chamber 281*c*. The suction chamber 281*c* continues to the second opening $V_2$. The hydraulic oil flows into the suction chamber 281*c* after passing through the second opening $V_2$.

The oil conduit 281Y is obliquely upwardly extended from the casing body 281X towards the suction pipe 290. The oil conduit 281Y forms a second oil conduit path $W_2$. The oil conduit 281Y includes an outlet $V_{OUT}$ formed on the tip of the second oil conduit path $W_2$. The second oil conduit path $W_2$ continues to the first oil conduit path $W_1$ through the outlet $V_{OUT}$, the second lower through hole $S_2$ and the inlet $V_{IN}$.

It should be noted that the hydraulic oil, drawn by the hydraulic pump 310, sequentially flows through the second opening $V_2$, the suction chamber 281*c*, the second oil conduit path $W_2$, the outlet $V_{OUT}$, the second lower through hole $S_2$, the inlet $V_{IN}$, the first oil conduit path $W_1$ and the first opening $V_1$ in this order.

The suction pipe 290 and the oil conduit 281Y are connected to the lower connecting member 270.

In the present exemplary embodiment, the second opening $V_2$ is herein disposed lower than the top end of the first opening $V_1$ (depicted with a broken line K in the figure) in the vertical direction.

In the present exemplary embodiment, the second opening $V_2$ is also disposed lower than the top end of the second lower through hole $S_2$ (depicted with the broken line K in the figure) in the vertical direction.

In the present exemplary embodiment, the second opening $V_2$ is also disposed lower than the top end of the outlet $V_{OUT}$ (depicted with a broken line L in the figure) in the vertical direction.

It is also noted in the present exemplary embodiment that cross-sectional areas are roughly identical among the first oil conduit path $W_1$, the second oil conduit path $W_2$ and the second lower through hole $S_2$.

Method of Manufacturing Hydraulic Oil Tank 200

Figure 13:
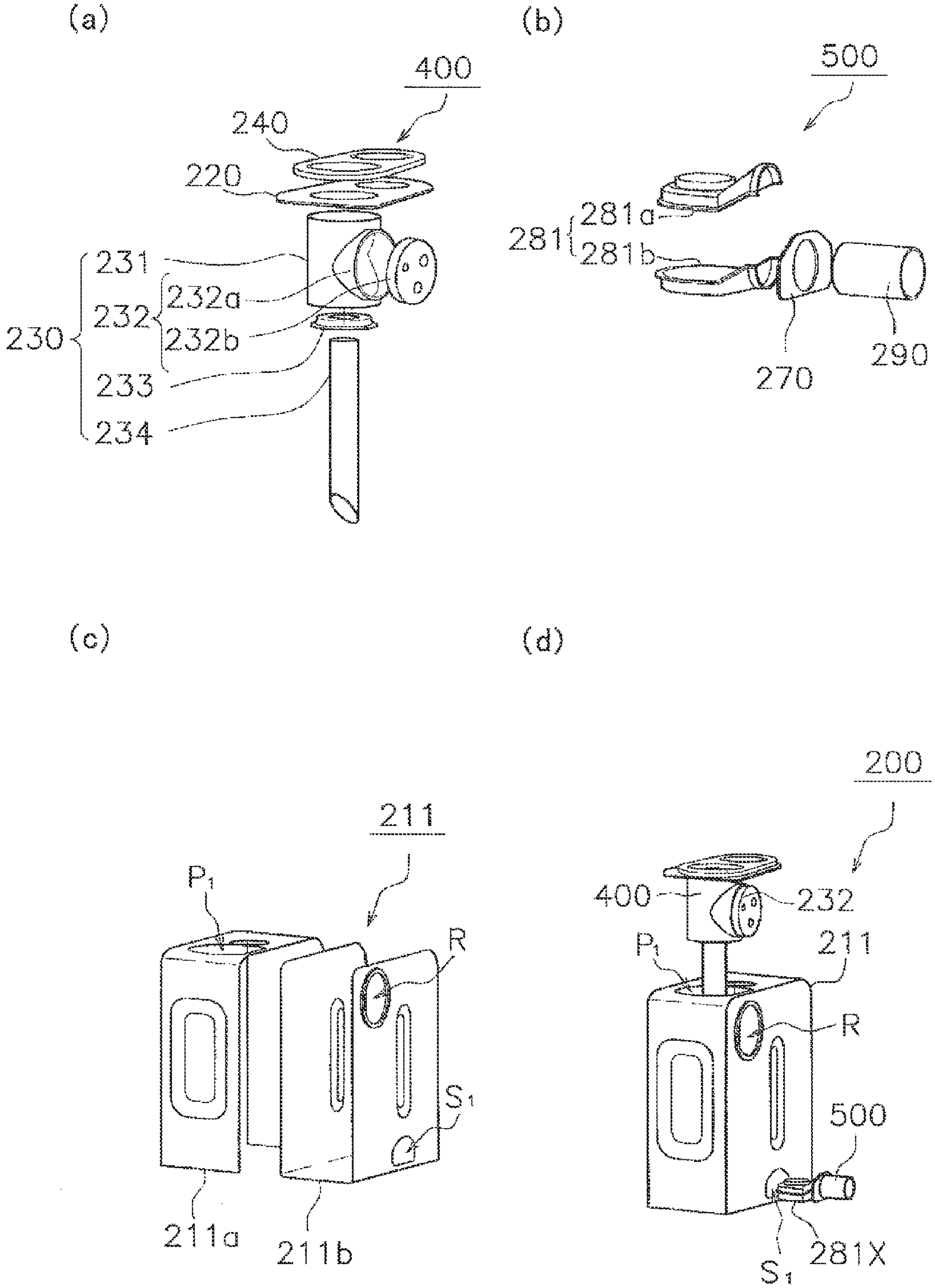
FIG. 13 is a diagram for explaining a method of manufacturing the hydraulic oil tank 200 according to the exemplary embodiment.

Next, a method of manufacturing the hydraulic oil tank 200 will be explained with reference to the drawings. FIG. 13 is a diagram for explaining the method of manufacturing the hydraulic oil tank 200 according to the present exemplary embodiment.

As illustrated in FIG. 13(*a*), an upper filtering device assembly 400 is fabricated.

Specifically, the upper filtering device 230 is firstly fabricated by welding the element chamber 231, the connector part 232*b*, the bottom part 233 and the conduit 234 to each other. Next, the flange 240 is welded to the top face of the upper connecting member 220. Further, the upper filtering device 230 is welded to the bottom face of the upper connecting member 220. Thus, fabrication of the upper filtering device assembly 400 is completed. Finally, a leakage check is conducted for the upper filtering device assembly 400 by filling it up with liquid (e.g., water).

Next, a lower filtering device assembly 500 is fabricated as illustrated in FIG. 13(*b*).

Specifically, the upper part 281$a$ and the lower part 281$b$ are firstly prepared, which are respectively molded in desired shapes by means of press molding. Next, the suction casing 281 is fabricated by welding the upper part 281$a$ and the lower part 281$b$ to each other. The suction pipe 290 is then welded to the lower connecting member 270. Further, the suction casing 281 is welded to the lower connecting member 270. Thus, fabrication of the lower filtering device assembly 500 is completed. Finally, a leakage check is conducted for the lower filtering device assembly 500 by filling it up with liquid.

Next, two plate members, respectively having through holes, are prepared and temporarily assembled as the main body 211, as illustrated in FIG. 13($c$).

Specifically, the first upper through hole $P_1$ and the first strainer through hole $Q_1$ are firstly bored through the first plate member 211$a$. Next, the first plate member 211$a$ is bent in a U-shape. Further, the first lower through hole $S_1$ and the fitting hole R are bored through the second plate member 211$b$. Next, the second plate member 211$b$ is bent in a U-shape. Yet further, the first and second plate members 211$a$ and 211$b$ are combined and set in a fixture tool, and are temporarily welded to each other. Accordingly, the main body 211 is temporarily assembled and the storage compartment 212 is formed.

Next, fabrication of the hydraulic oil tank 200 is completed as illustrated in FIG. 13($d$).

Specifically, the upper filtering device 230 of the upper filtering device assembly 400 is firstly inserted into the storage compartment 212 through the first upper through hole $P_1$. Subsequently, the communication part 232 of the upper filtering device 230 is appropriately positioned and the connector part 232$b$ of the communication part 232 is fitted into the fitting hole R. Accordingly, the communication part 232 is overlapped with the inner edge of the first upper through hole $P_1$ in a plan view of the first upper through hole $P_1$ seen from the inside of the storage compartment 212. Next, the upper filtering device assembly 400 is temporarily welded to the main body 211 (the first plate member 211$a$).

Next, the suction casing 281 of the lower filtering device assembly 500 is inserted into the storage compartment 212 through the first lower through hole $S_1$. Subsequently, the casing body 281X of the suction casing 281 is appropriately positioned. Accordingly, the suction casing 281 is overlapped with the inner edge of the first lower through hole $S_1$ in a plan view of the first lower through hole $S_1$ seen from the inside of the storage compartment 212. Next, the lower filtering device assembly 500 is temporarily attached to the main body 211 (the second plate member 211$b$).

Next, the first and second plate members 211$a$ and 211$b$ are permanently welded from the outside along the contact line by means of a welder robot, thereby the housing 210 is fabricated.

Next, the outer circumference of the upper connecting member 220 of the upper filtering device assembly 400 is permanently welded to the main body 211 (the first plate member 211$a$) from the top face $T_1$ side of the main body 211 by means of the welder robot. Subsequently, the communication part 232 of the upper filtering device 230 is permanently welded to the main body 211 (the second plate member 211$b$) from the lateral face $T_2$ side of the main body 211 by means of the welder robot. Next, the outer circumference of the lower connecting member 270 of the lower filtering device assembly 500 is permanently welded to the main body 211 (the second plate member 211$b$) from the lateral face $T_2$ side of the main body 211 by means of the welder robot.

Finally, the storage compartment 212 is filled up with liquid and a leakage check is then conducted under the condition that the first lid part 250 and the second lid part 260 are attached.

Working Effects (1) The hydraulic oil tank 200 according to the present exemplary embodiment includes the housing 210 with the main body 211, the upper connecting member 220 connected to the top face $T_1$ (outer surface) of the main body 211, and the upper filtering device 230 connected to the upper connecting member 220. The outer circumference of the upper connecting member 220 is greater than the circumference of the first upper through hole $P_1$ (first through hole) in a plan view of the top face $T_1$.

With the structure, the upper connecting member 220 can be welded to the main body 211 from the outer surface side of the main body 211. Therefore, interference between a welding torch and the main body 211 can be inhibited compared to the structure that the upper connecting member 220 is welded to the main body 211 from the inner surface side of the main body 211, thereby automatic welding can be efficiently implemented by the welder robot. Further, it is possible to inhibit spatter or dust to be produced in welding from remaining within the main body 211, thereby cleanliness within the main body 211 can be enhanced. Yet further, when a malfunction is found in the welded part between the upper filtering device 230 and the main body 211, the welded part can be repaired without disassembling the main body 211.

Further, since the first upper through hole $P_1$ can be covered with the upper connecting member 220, the first upper through hole $P_1$ can be more reliably closed, compared to the structure that the upper filtering device 230 is fitted into and welded to the first upper through hole $P_1$. In other words, sealing performance required for the hydraulic oil tank 200 can be reliably obtained by welding the upper connecting member 220 to the main body 211.

Further, the upper connecting member 220 includes the planar contact face 220S, while the upper filtering device 230 includes the communication part 232 overlapped with the inner edge of the first upper through hole $P_1$ in a plan view of the first upper through hole $P_1$ seen from the inside of the storage compartment 212.

Thus, since the upper connecting member 220 is abutted to the housing 210 with the planar contact face 220S, the upper connecting member 220 can be thereby freely moved on the top face $T_1$ of the housing 210 after the upper filtering device 230 connected to the upper connecting member 220 is inserted into the housing 210 through the first upper through hole $P_1$. Therefore, the upper filtering device 230 can be easily positioned even when the communication part 232 is not aligned with the center line of the element chamber 231.

(2) In the hydraulic oil tank 200 according to the present exemplary embodiment, the second upper through hole $P_2$ (second through hole) of the upper connecting member 220 is positioned inwards of the third upper through hole $P_3$ (third through hole) of the flange 240 in a plan view of the top face $T_1$.

Therefore, the upper connecting member 220 is exposed within the third upper through hole P3. With the structure, since the flange 240 can be welded to the upper connecting member 220 within the third upper through hole P3, sealing performance of the hydraulic oil tank 200 can be enhanced.

(3) In the hydraulic oil tank 200 according to the present exemplary embodiment, the outer circumference of the upper filtering device 230 is greater than the circumference of the second upper through hole $P_2$ of the upper connecting member 220 in a plan view of the top face $U_1$ of the storage compartment 212.

Therefore, the second upper through hole $P_2$ can be closed by the upper filtering device 230 even when the upper filtering device 230 is somewhat misaligned with the second upper through hole $P_2$ in welding the upper filtering device 230 to the upper connecting member 220. Thus, since it is not required to accurately match the upper filtering device 230 and the second upper through hole $P_2$, welding of the upper filtering device 230 can be thereby executed simply and easily.

(4) In the hydraulic oil tank 200 according to the present exemplary embodiment, the outer circumference of the upper filtering device 230 is positioned within the first upper through hole $P_1$ in a plan view of the top face $U_1$ of the storage compartment 212. Therefore, since the upper filtering device 230 can be inserted into the first upper through hole $P_1$, the upper connecting member 220 can be thereby welded to the main body 211 from the top face $T_1$ side.

(5) The hydraulic oil tank 200 according to the present exemplary embodiment includes the housing 210 with the main body 211, the lower connecting member 270 connected to the lateral face $T_2$ of the main body 211, and the lower filtering device 280 connected to the lower connecting member 270. The outer circumference of the lower connecting member 270 is greater than the circumference of the first lower through hole $S_1$ (first through hole) in a plan view of the lateral face $T_2$.

With the structure, the lower connecting member 270 can be welded to the main body 211 from the outer surface side of the main body 211. Therefore, interference between the welding torch and the main body 211 can be inhibited, compared to the structure that the lower connecting member 270 is welded to the main body 211 from the inner surface side of the main body 211, thereby automatic welding can be efficiently implemented by the welder robot. Further, since it is possible to inhibit spatter or dust to be produced in welding from remaining within the main body 211, cleanliness within the main body 211 can be enhanced. Yet further, when a malfunction is found in the welded part between the lower filtering device 280 and the main body 211, the welded part can be repaired without disassembling the main body 211.

Further, since the first lower through hole $S_1$ can be covered with the lower connecting member 270, the first lower through hole $S_1$ can be thereby more reliably closed, compared to the structure that the lower filtering device 280 is fitted into and welded to the first lower through hole $S_1$. Therefore, sealing performance required for the hydraulic oil tank 200 can be easily obtained by welding the lower connecting member 270 to the main body 211.

Further, the lower connecting member 270 includes the planar contact face 270S, while the lower filtering device 280 includes the suction casing 281 overlapped with the inner edge of the first lower through hole $S_1$ in a plan view of the first lower through hole $S_1$ seen from the inside of the storage compartment 212.

Thus, since the lower connecting member 270 is abutted to the housing 210 with the planar contact face 270S, the lower filtering device 280, connected to the lower connecting member 270, can be freely moved on the lateral face $T_2$ of the housing 210 after being inserted into the housing 210 through the first lower through hole $S_1$. Therefore, the lower filtering device 280 can be easily positioned even when the suction casing 281 is not aligned with the center line of the suction pipe 290.

(6) In the hydraulic oil tank 200 according to the present exemplary embodiment, the lower hem $g_1$ of the lower connecting member 270 is arranged along the lower hem $g_2$ of the lateral face $U_2$.

Thus, since the lower connecting member 270 can be disposed closer to the lower hem $g_2$ of the lateral face $U_2$, the suction pipe 290 can be disposed as low as possible. Consequently, the hydraulic oil can be drawn from the vicinity of the bottom surface of the storage compartment 212.

(7) In the hydraulic oil tank 200 according to the present exemplary embodiment, the second opening $V_2$ of the suction casing 281 is disposed lower than the top end K of the first opening $V_1$ of the suction pipe 290.

Therefore, the hydraulic oil can be drawn from the vicinity of the bottom surface of the storage compartment 212, compared to the structure that the second opening $V_2$ is disposed higher than the top end K of the first opening $V_1$.

(8) A method of manufacturing the hydraulic oil tank 200 according to the present exemplary embodiment includes the steps of: connecting the upper filtering device 230 to the upper connecting member 220 having an outer circumference greater than the circumference of the first upper through hole $P_1$ (first through hole); passing the upper filtering device 230 through the first upper through hole $P_1$; and connecting the outer periphery of the upper connecting member 220 to the housing 210.

Therefore, the upper connecting member 220 can be welded to the main body 211 from the outer surface side of the main body 211. In other words, since interference between the welding torch and the main body 211 can be inhibited, compared to the structure that the upper connecting member 220 is welded to the main body 211 from the inner surface side of the main body 211, automatic welding can be efficiently implemented by the welder robot. Further, since it is possible to inhibit spatter and dust produced in welding from remaining within the main body 211, cleanliness within the main body 211 can be enhanced. Yet further, when a malfunction is found in the welded part between the upper filtering device 230 and the main body 211, the welded part can be repaired without disassembling the main body 211.

(9) In the method of manufacturing the hydraulic oil tank 200 according to the present exemplary embodiment, the upper filtering device 230 is passed through the first upper through hole $P_1$, and the connector part **232*b*** is then fitted into the fitting hole R.

Thus, since the upper filtering device 230 and the upper connecting member 220 have been already assembled, the position of the upper filtering device 230 can be minutely adjusted through the upper connecting member 220 in fitting the connector part **232*b* into the fitting hole R. Consequently, the connector part 232*b*** can be easily fitted into the fitting hole R.

Other Exemplary Embodiments

The present invention has been exemplified by the aforementioned embodiment, but it should be understood that the description and drawings, constituting a part of this disclosure, do not limit the scope of the present invention. Alternative embodiments, examples and operational arts would be apparent to those skilled in the art from this disclosure.

(A) In the aforementioned exemplary embodiment, the hydraulic oil tank 200 includes the upper connecting member 220 and the flange 240 as separate components, but the structure of the hydraulic oil tank 200 is not limited to this. For example, the upper connecting member 220 may be integrated with the flange 240. Alternatively, the hydraulic oil tank 200 may not include the flange 240 when the upper connecting member 220 functions as a flange. In this case, the second upper through hole $P_2$ and the second strainer through hole $Q_2$ may be closed by directly attaching the first and second lid parts 250 and 260 to the upper connecting member 220.

(B) In the aforementioned exemplary embodiment, the upper connecting member 220 includes the first upper through hole $P_1$, but the upper connecting member 220 may not include the first upper through hole $P_1$. In this case, the hydraulic oil tank 200 may not include the flange 240 and the first lid part 250.

(C) In the aforementioned exemplary embodiment, the hydraulic oil tank 200 includes the upper connecting member 220 and the lower connecting member 270, but the hydraulic oil tank 200 may include only one of the members.

(D) In the aforementioned exemplary embodiment, the second upper through hole $P_2$ is positioned within the third upper through hole $P_3$ in a plan view of the top face $T_1$, but the structure of the second upper through hole $P_2$ is not limited to this. The circumference of the second upper through hole $P_2$ may be matched with that of the third upper through hole $P_3$, and the circumference of the second upper through hole $P_2$ may be greater than that of the third upper through hole $P_3$.

(E) In the aforementioned exemplary embodiment, the upper connecting member 220 includes the second upper through hole $P_2$ and the second strainer through hole $Q_2$, but the upper connecting member 220 may include only the second upper through hole $P_2$. In this case, the hydraulic oil tank 200 is required to additionally include an upper connecting member having the second strainer through hole $Q_2$.

(F) In the aforementioned exemplary embodiment, the filtering device assemblies (i.e., the upper filtering device assembly 400 and the lower filtering device assembly 500) are temporarily welded to the temporarily assembled main body 211, but the welding method is not limited to this. For example, the filtering device assemblies may be temporarily welded to the permanently welded main body 211.

(G) The suction casing 281 may be fixed to the housing 210, although not particularly described in the aforementioned exemplary embodiment. In this case, it is possible to inhibit force from acting on the connected part between the lower filtering device 280 and the lower connecting member 270.

Figure 14:
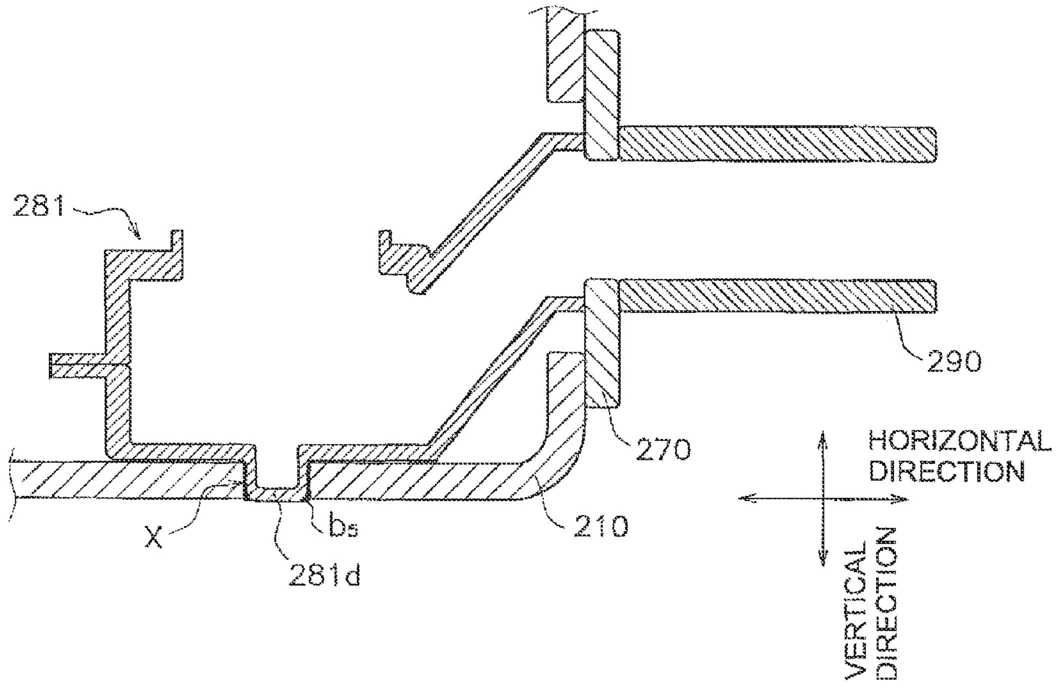
FIG. 14 is a cross-sectional side view of the hydraulic oil tank 200 according to the exemplary embodiment.
Figure 15:
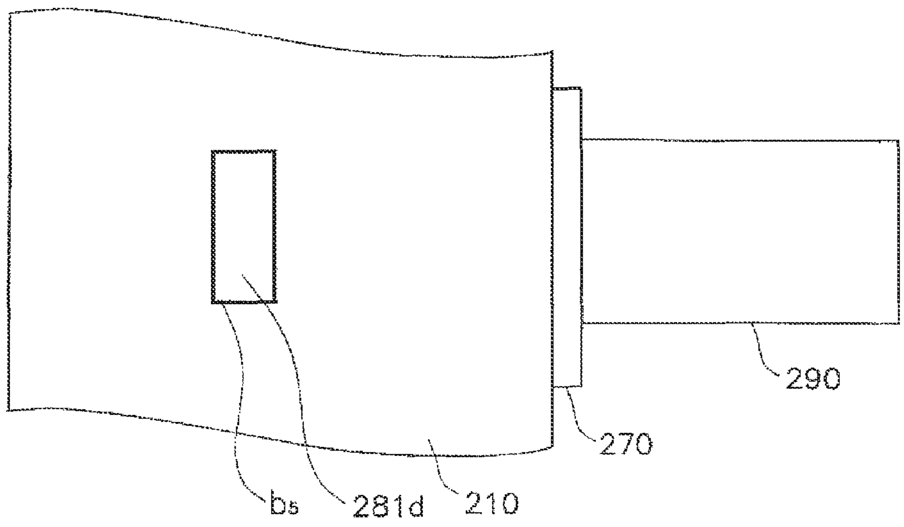
FIG. 15 is a bottom-side plan view of the hydraulic oil tank 200 according to the exemplary embodiment.

Specifically, as illustrated in FIGS. 14 and 15, the housing 210 includes a fixation hole X penetrating the main body 211 from the bottom face (outer surface) of the main body 211 to the bottom surface (inner surface) of the storage compartment 212. The suction casing 281 includes a convex portion 281*d* to be inserted into the fixation hole X from the bottom surface side of the storage compartment 212. The convex portion 281*d* can be formed by means of drawing, but the method of forming the convex portion 281*d* is not limited to this.

The convex portion 281*d* is herein welded to the main body 211 from the bottom face side of the main body 211. A weld bead $b_5$ is formed along the outer periphery of the convex portion 281*d* by means of welding. Thus, since the convex portion 281*d* is welded to the main body 211 from the outer surface side, cleanliness within the storage compartment 212 can be maintained, compared to the structure that the suction casing 281 is directly welded to the bottom surface of the storage compartment 212.

Thus, it is obvious that the present invention encompasses a variety of embodiments and the like not described herein. Therefore, the technical scope of the present invention is defined only by an invention-specifying matter according to claims, which are reasonable on the basis of the aforementioned description.

According to the above described embodiments of the present invention, since it is possible to provide a hydraulic oil tank for easily achieving required sealing performance by means of welding, a method of manufacturing a hydraulic oil tank and a construction vehicle equipped with a hydraulic oil tank, the embodiments can be applicable to the field of the construction vehicles.

What is claimed is:

1. A hydraulic oil tank comprising:

a housing including a main body, a storage compartment and a first through hole, the storage compartment being formed within the main body for containing a hydraulic oil, and the first through hole being formed through the main body;

a connecting member welded on the main body and covering the first through hole, the connecting member including a contact face butted to the housing, the contact face having a planar shape, the connecting member having a plate shape; and a filtering device welded within the storage compartment, the filtering device being connected to a part of the contact face exposed within the first through hole, and the filtering device including an overlapped portion overlapping with an inner edge of the first through hole in a plan view of the first through hole seen from inside of the storage compartment.

2. The hydraulic oil tank according to claim 1, wherein the first through hole is formed through a top face of the main body, the housing includes an hydraulic oil inlet formed through a lateral face of the main body, the filtering device includes a tubular element chamber welded to the contact face of the connecting member and a communication path communicating with the element chamber and the hydraulic oil inlet, and the communication path is composed of the overlapped portion.

3. The hydraulic oil tank according to claim 1, further comprising:

a flange connected onto the connecting member, wherein the connecting member includes a second through hole continuing to the first through hole, and the flange includes a third through hole continuing to the second through hole.

4. The hydraulic oil tank according to claim 3, wherein the housing includes a fourth through hole formed through the main body, the fourth through hole covered with the connecting member, the connecting member includes a fifth through hole continuing to the fourth through hole, and the flange includes a sixth through hole continuing to the fifth through hole.

5. The hydraulic oil tank according to claim 3, wherein the second through hole is positioned inwards of the third through hole in a plan view of the top face.

6. The hydraulic oil tank according to claim 1, wherein the first through hole is formed through a lateral face of the main body, the filtering device includes a suction casing welded to the contact face of the connecting member and a strainer disposed on the suction casing, and the suction casing is composed of the overlapped portion.

7. The hydraulic oil tank according to claim 6, wherein a lower hem of the connecting member is arranged along a lower hem of the lateral face.

8. The hydraulic oil tank according to claim 6, wherein the casing includes a fixation hole formed through a bottom face of the main body, and the suction casing includes a convex portion to be inserted into the fixation hole and welded to the bottom face.

9. The hydraulic oil tank according to claim 6, further comprising:

a suction pipe extended from the connecting member, the suction pipe including a first opening sidewardly opened, wherein the suction casing includes a second opening upwardly opened, the second opening disposed lower than a top end of the first opening.

10. A construction vehicle comprising:

a working unit;

the hydraulic oil tank according to claim 1; and a hydraulic pump configured to draw the hydraulic oil from the hydraulic oil tank and circulate the hydraulic oil through the working unit.

11. A method of manufacturing a hydraulic oil tank, comprising:

preparing a first plate member including a first through hole;

welded a filtering device to a contact face of a connecting member having an outer circumference greater than a circumference of the first through hole, the connecting member having a plate shape, the connecting member having a plate shape;

passing the filtering device through the first through hole and butting the contact face to the housing;

positioning the filtering device; and welded an outer periphery of the connecting member to the first plate member.

12. The method of manufacturing a hydraulic oil tank according to claim 11, wherein the positioning of the filtering device includes overlapping an overlapped portion of the filtering device with an inner edge of the first through hole in a plan view of the first through hole seen from inside of a storage compartment.

13. The method of manufacturing a hydraulic oil tank according to claim 11, further comprising preparing a second plate member including a fitting hole; and fitting a connector part of the filtering device into the fitting hole after passing the filtering device through the first through hole, the connector part being connected to a hydraulic oil pipe for supplying the hydraulic oil.

14. The method of manufacturing a hydraulic oil tank according to claim 11, further comprising:

forming a second through hole penetrating the connecting member.

* * * * *